(12) United States Patent
Sgro et al.

(10) Patent No.: US 9,449,285 B2
(45) Date of Patent: *Sep. 20, 2016

(54) SYSTEM AND METHOD FOR USING PATTERN RECOGNITION TO MONITOR AND MAINTAIN STATUS QUO

(71) Applicant: Connotate, Inc., New Brunswick, NJ (US)

(72) Inventors: Vincent Sgro, Franklin Park, NJ (US); Aravind Kalyan Varma Datla, Riverdale, NJ (US); HimaBindu Datla, Manchester, CT (US)

(73) Assignee: Connotate, Inc., New Brunswick, NJ (US)

( * ) Notice: Subject to any disclaimer, the term of this patent is extended or adjusted under 35 U.S.C. 154(b) by 414 days.

This patent is subject to a terminal disclaimer.

(21) Appl. No.: 14/161,274

(22) Filed: Jan. 22, 2014

(65) Prior Publication Data

US 2014/0136457 A1 May 15, 2014

Related U.S. Application Data

(63) Continuation of application No. 12/945,760, filed on Nov. 12, 2010, now Pat. No. 8,666,913.

(60) Provisional application No. 61/260,643, filed on Nov. 12, 2009.

(51) Int. Cl.
| | | |
|---|---|---|
| G06F 15/18 | (2006.01) | |
| G06F 17/00 | (2006.01) | |
| G06N 5/02 | (2006.01) | |
| G06F 7/00 | (2006.01) | |
| G06F 17/30 | (2006.01) | |
| G06N 99/00 | (2010.01) | |
| G06F 11/07 | (2006.01) | |
| G06F 11/30 | (2006.01) | |

(52) U.S. Cl.
CPC ......... *G06N 99/005* (2013.01); *G06F 11/0709* (2013.01); *G06F 11/0751* (2013.01); *G06F 11/3006* (2013.01); *G06F 11/3072* (2013.01); *G06N 5/02* (2013.01)

(58) Field of Classification Search
None
See application file for complete search history.

(56) References Cited

U.S. PATENT DOCUMENTS

| | | |
|---|---|---|
| 6,651,059 B1 | 11/2003 | Sundaresan et al. |
| 6,662,190 B2 | 12/2003 | Bax et al. |
| 6,892,189 B2 | 5/2005 | Quass et al. |
| 6,912,555 B2 | 6/2005 | Lemon et al. |
| 6,973,459 B1 | 12/2005 | Yarmus |

(Continued)

*Primary Examiner* — Kakali Chaki
*Assistant Examiner* — Daniel Pellett
(74) *Attorney, Agent, or Firm* — Foley & Lardner LLP; John D. Lanza

(57) ABSTRACT

A system for prospectively identifying media characteristics for inclusion in media content is disclosed. A neural network database including media characteristic information and feature information may associate relationships among the media characteristic information and feature information. Personal characteristic information associated with target media consumers may be used to select a subset of the neural network database. A first set of nodes, representing selected feature information, may be activated. The node interactions may be calculated to detect the activation of a second set of nodes, the second set of nodes representing media characteristic information. Generally, a node is activated when an activation value of the node exceeds a threshold value. Media characteristic information may be identified for inclusion in media content based on the second set of nodes.

20 Claims, 6 Drawing Sheets

(56) References Cited

U.S. PATENT DOCUMENTS

| | | |
|---|---|---|
| 7,055,094 B2 | 5/2006 | Imielinski et al. |
| 7,581,170 B2 | 8/2009 | Baumgartner et al. |
| 7,606,816 B2 | 10/2009 | Kulkarni |
| 7,756,881 B2 | 7/2010 | Crivat et al. |
| 2003/0212678 A1 | 11/2003 | Bloom et al. |
| 2006/0026157 A1 | 2/2006 | Gupta et al. |
| 2006/0136462 A1 | 6/2006 | Campos et al. |
| 2007/0220034 A1 | 9/2007 | Iyer et al. |

SYSTEM AND METHOD FOR USING PATTERN RECOGNITION TO MONITOR AND MAINTAIN STATUS QUO

CROSS-REFERENCE TO RELATED PATENT APPLICATIONS

The present application claims priority to U.S. patent application Ser. No. 12/945,760, filed Nov. 12, 2013, and titled "System and Method for Using Pattern Recognition to Monitor and Maintain Status Quo," which issued as U.S. Pat. No. 8,666,913 on Mar. 4, 2014, and which claims the benefit of U.S. Provisional Patent Application Ser. No. 61/260,643, filed Nov. 12, 2009, the entirety of which is hereby incorporated by reference.

FIELD OF THE INVENTION

The present invention relates generally to a system and method for monitoring data extracted from a content source by using samples of the received data to specify parameters, adjusting those parameters, determining which parameters can be trusted, and ultimately detecting a failure upon receiving inaccurate subsequent data.

BACKGROUND OF THE INVENTION

The automated extraction or mining of data from content sources is a growing industry. The extraction of data can be from either a structured content source, such as databases with structured content, or a semi-structured content source, such as a Web page on the World Wide Web (WWW), electronic mail messages, PDF and XML. The extraction of data from a semi-structured content source is more difficult than from a structured content source. This is because the data in a semi-structured content source does not conform to the formal structure of tables and data models associated with databases. Repetitive extraction of correct data from semi-structured content sources is difficult due to the structure, or lack thereof, of the data.

Due to the lack of structure, extracting data from a semi-structured content source requires the application of very creative techniques that cannot achieve the absolute perfection of the straight-forward techniques applied to well-structured data sources. Even if the data is being successfully extracted from a content source, there can still be changes in the content source and/or data that can bring about issues in subsequent extractions. One of the most common changes are those made to the Hypertext Mark-up Language (HTML) of a Web page. While there are differences in the fragility of certain extraction techniques, these changes to the HTML can ultimately prove to be significant enough as to cause the data extraction from a Web page to fail. Human monitoring of all subsequent extractions would be a massive undertaking. Therefore, in systems that routinely obtain or extract data from content sources, there is a need for a method and system of automating the quality monitoring and control of the data extracted.

As noted, the initial extraction of data from a semi-structured content source can be very difficult. Even if the initial data mining from a semi-structured source is successfully accomplished, the ultimate desire is to repeatedly obtain correct and well-structured data from a potentially changing semi-structured content source. Because there are no well-structured "landmarks" in the semi-structured content and the data is not necessarily embedded in the content in the desired form, the automated techniques used to get the data are heuristic in nature. That is, the data ultimately extracted may not actually be the data desired. Extracting incorrect data can cause errors in later processing steps of the information and/or could be transmitted to an unknowing user. The data extraction tool used to extract the data from the content source might not be configured to or he able to notify a system administrator that the data being extracted is not actually the data desired. Therefore, there is a need for a system and method for notifying or signally when the data extracted from a changing semi-structured content source is not the correct or desired data.

One example of a semi-structured content source is a Web page. Data extraction/mining from a Web page can be difficult. This is partially true because Web pages on the WWW are in a semi-structured format. Web pages are typically defined in HTML. Data mining is hindered by the fact that there is no defined structure for organizing the data on a Web page, and it is difficult to determine the Web page scheme as it is buried in the underlying HTML code. Additionally, a similar visual effect as defined by the Web page scheme can be achieved with different HTML features such as HTML tables, ordered lists or HTML tagging adding to the difficulty of data mining from a Web page.

Therefore, even if the initial extraction of data from a Web page is successfully accomplished, issues can arise in subsequent extractions. One such issue is when the Web page appearance, layout, or format of the data is changed. When the data on a Web page is altered, the data mining tool becomes susceptible to extracting data that is not desired or other extraction errors. This can lead to a multitude of other issues, including but not limited to receiving mislabeled data, receiving only portions of the desired data, or receiving none of the desired data at all from the Web page.

Therefore there is a need for a system and method for monitoring and controlling the quality of the data yielded from a content source, and specifically from semi-structured content source. In systems that routinely obtain or extract data from semi-structured content sources, there is a further need for a method and system of automating the quality monitoring and control of the data extracted. Finally, there is a need for a system and method for notifying or signaling when the data extracted from a content source is not the correct or desired data.

SUMMARY OF THE INVENTION

The present invention provides for a system and method for monitoring data extracted from a content source by using samples of the received data to specify parameters, adjusting those parameters, determining which parameters can be trusted, and ultimately detecting a failure upon receiving inaccurate subsequent data.

In one embodiment, the invention can be a method of checking data gathered from a content source comprising: a) receiving initial data from the content source, the initial data having characteristics; b) training a data profiler to generate a set of trusted constraint modules, said training comprising (1) selecting constraint modules having parameters that are applicable to the characteristics of the initial data from a plurality of constraint modules, (2) adjusting the parameters of the applicable constraint modules to conform with characteristics of newly acquired data from the content source, (3) identifying non-stable constraint modules from the applicable constraint modules based on said adjusting, and (4) generating a set of trusted constraint modules by removing the non-stable constraint modules from the applicable constraint modules; c) applying the set of trusted constraint modules to subsequently received data from the content source to determine whether characteristics of the subsequently received data meet the parameters of the set of trusted constraint modules; and d) signaling a failure upon the characteristics of the subsequently received data failing to meet the parameters of the set of trusted constraint modules.

In another embodiment, the invention can be a system for checking data gathered from a content source comprising: a data extractor configured to extract initial data, newly acquired data, and subsequent data from the content source, the initial data, the newly acquired data, and the subsequent data having characteristics; a plurality of constraint modules, each constraint module having parameters; and a data profiler configured to: (1) receive the initial data, the newly acquired data, and the subsequent data from the data extractor; (2) train the plurality of constraint modules by selecting constraint modules having parameters that are applicable to the characteristics of the initial data from the plurality of constraint modules and adjusting the parameters of the applicable constraint modules to conform with the characteristics of the newly acquired data from the content source; (3) generate a set of trusted constraint modules by identifying non-stable constraint modules from the applicable constraint modules based on said adjusting and removing the non-stable constraint modules from the applicable constraint modules; (4) detect a change in the content source by detecting whether characteristics of the subsequent data fail to meet the parameters of the set of trusted constraint modules; and (5) signal the change in the content source by signaling a failure upon the characteristics of the subsequent data failing to meet the parameters of the set of trusted constraint modules.

DETAILED DESCRIPTION OF THE DRAWINGS

Figure 1:
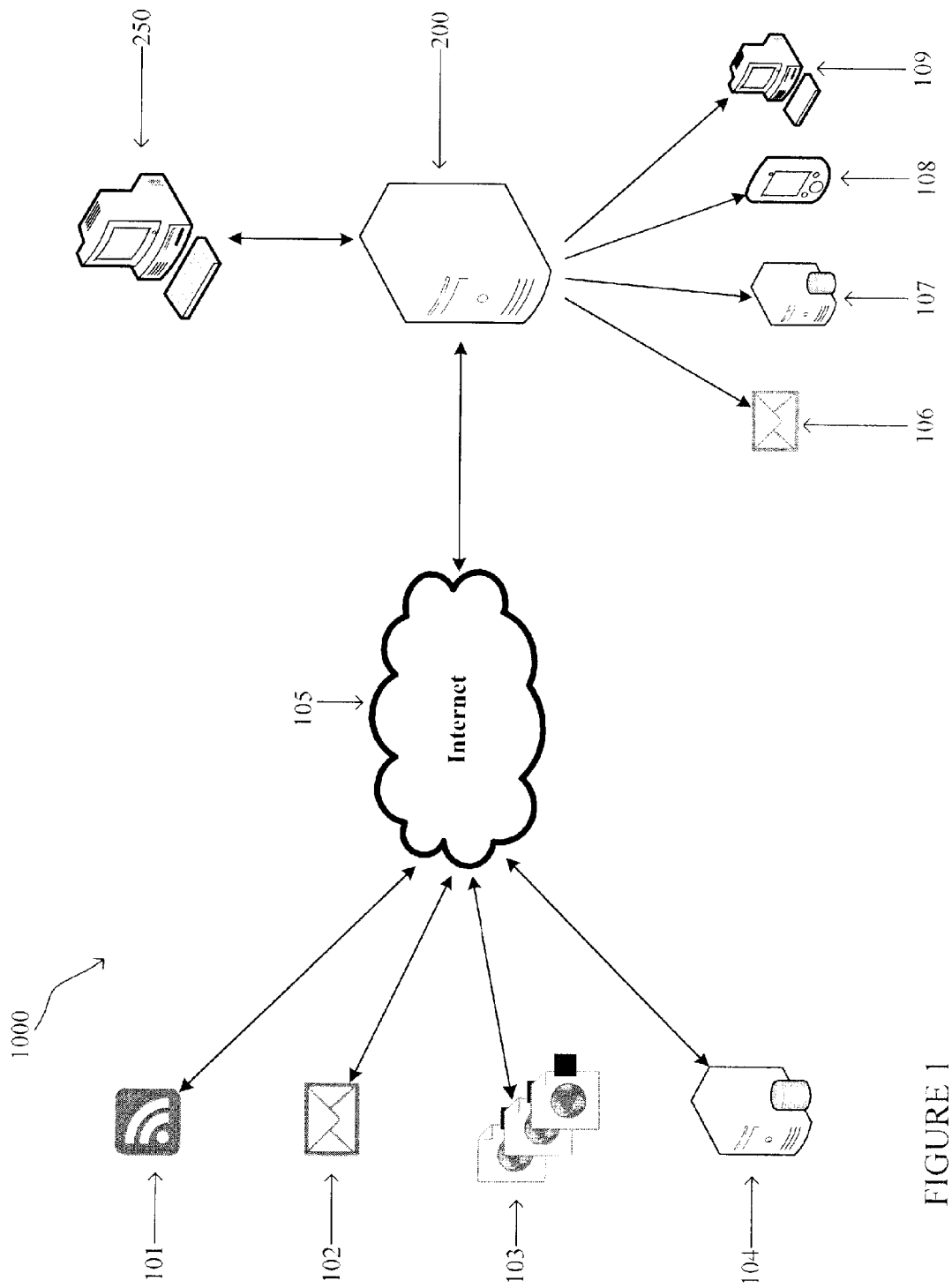
FIG. 1 is a schematic of a system according to an embodiment of the present invention.

Referring to FIG. 1, a schematic of a system 1000 according to an embodiment of the present invention is illustrated. A server 200 extracts data, through the internet 105, from at least one of a plurality of content sources 101-104. The plurality of content sources 101-104 can comprise data in either a structured or semi-structured format. The content sources could be an RSS feed 101 or other XML based content source, email 102, a Web page, Web site, or Web service 103, and/or a database 104. However, the present invention is not so limited and any other content source accessible through a local area network or a wide area network.

In the preferred embodiment, the server 200 is controlled by a user through the use of a computer 250, as will be described in more detail below. After data is extracted from one of the content sources 101-104 by the server 200, the data is processed by the server 200 and transmitted to an end user. The end user receives the data through at least one of an email account 106, a database 107, a mobile device 108, or a desktop computer 109. However, the present invention is not so limiting and other methods of transmitting data to the end user can be used. Further, as discussed below, if the data received from one of the plurality of content sources 101-104 is nonconforming, the server 200 signals an error. In the preferred embodiment, the error is signaled by sending a signal from the server 200 to any of an email account 106, a database 107 for entry into a log, a mobile device 108 through SMS or other data application, through Microsoft SCOM® or other monitoring agent, and/or to a user at a computer terminal 109. Further, the signaling of the error can comprise sending an error signal to the processor 206 of the server 200 to correct subsequent extractions of data from at least one of the plurality of content sources 101-104.

Figure 2:
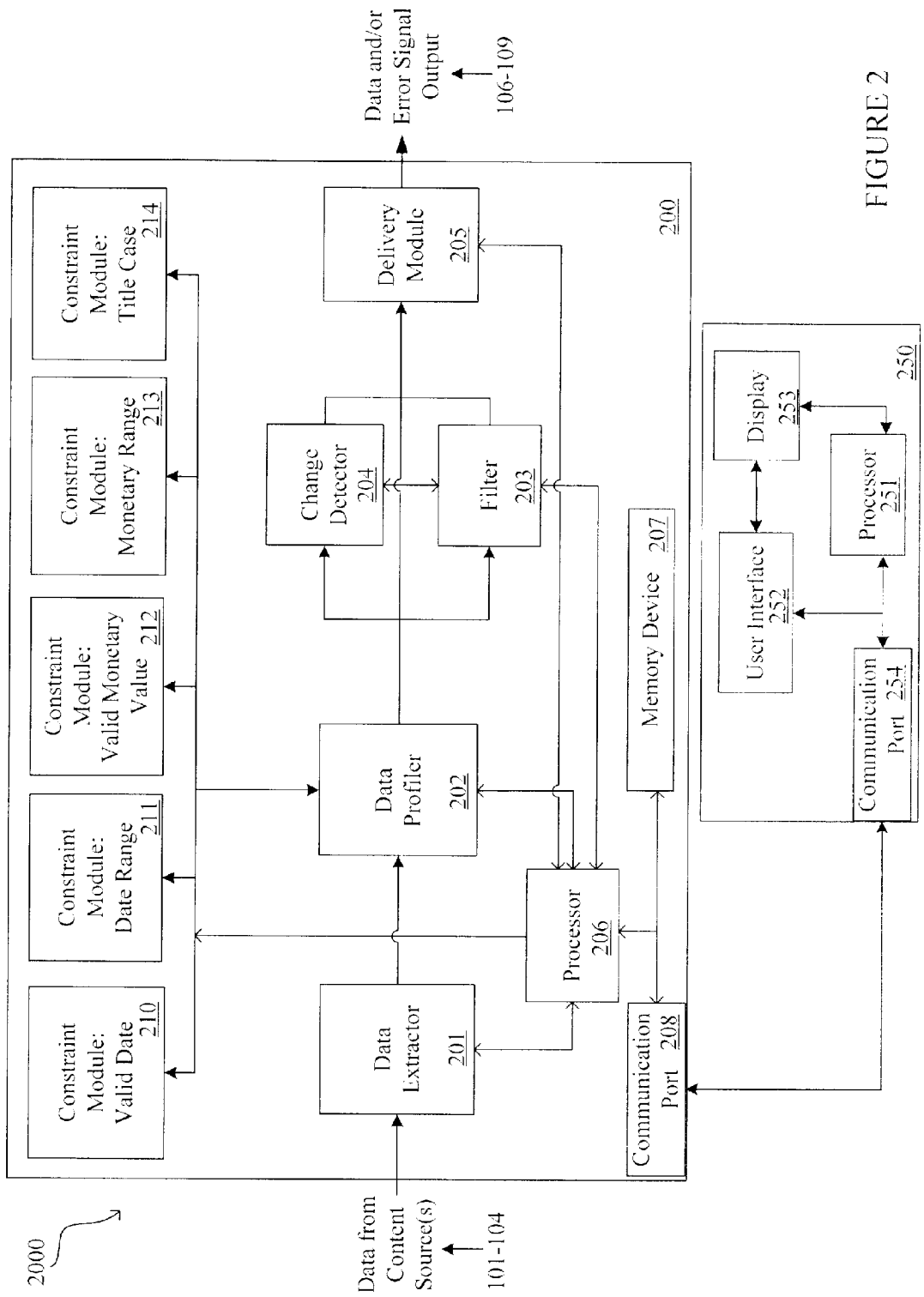
FIG. 2 is a schematic of a server and computer according to an embodiment of the present invention.

Referring now to FIG. 2, a schematic of the sever 200 and computer 250 according to an embodiment of the present invention is illustrated. The computer 250 comprises a processor 251, a user interface 252, a display 253, and a communication port 254. The processor 251 is configured to control the interaction of the user interface 252, the display 253, and the communication port 254. The display 253 and user interface 252 are configured to allow an interface between a user of the computer 250 and the processor 251. The communication port 254 is configured to allow for communication between the computer 250 and the server 200 through communication port 208. It should be noted that communication ports 208 and 254 include any means for communicating between a server and computer known in the art, including both wired and wireless communication.

The server 200 generally comprises a data extractor 201, a data profiler 202, a change detector 203, a filter 204, a delivery module 205, a processor 206, a memory device 207, a communication port 208, and a plurality of constraint modules 210-214. Even though the preferred embodiment of the present invention only comprises the use of one server 200, in alternate embodiments any number of servers can be used to perform the functions of the server 200.

In the exemplified embodiment, the server 200 is controlled by an internal processor 206. The processor 206 controls the operation of and interaction between the data extractor 201, the data profiler 202, the change detector 204, the filter 203, the delivery module 205, the memory device 207, the communication port 208, and the plurality of constraint modules 210-2.14. The memory device 207 is connected to the processor 206 and allows for the temporary and/or permanent storage of information. As noted above, the communication port 208 is configured to allow for communication between the computer 250 and the server 200.

In the exemplified embodiment, data is extracted by the data extractor 201 from at least one of the plurality of content sources 101-104. One example of a data extractor is described in detail in U.S. Pat. No. 7,055,094, the entirety of which is hereby incorporated by reference. However, the present invention is not so limited and other data extractors can be used as desired. As specified above, the content source from which the data extractor 201 extracts data can be, without limitation, RSS feed 101 or other XML based content source, email 102, a Web page, Web site, or Web service 103, or a database 104, or any other collection of electronic information. In the preferred embodiment, the data extracted by the data extractor 201 is converted to XML DOM format. In alternate embodiments, the data can be converted to other formats known in the art.

In the exemplified embodiment, the data extractor 201 extracts the data in a plurality of data elements. The extracted data can comprise just a singular data element. However, in the preferred embodiment, the extracted data will comprise a plurality of data elements. One content source can have, and typically will have, data that comprises different data elements than the data from another content source. Even if multiple content sources contain the same data, the data elements can be presented in different formats. Data elements can be, without limitation, titles, dates, people's names, product names, restaurant names, addresses, ratings, headlines, prices, phone numbers, model, year, condition, number of bedrooms, descriptions, statistical information, summary information, etc.

A data element extracted from a particular content source can have a common set of characteristics that are uniform across that group of data elements from that content source. For example, the dates on a Web page might all be formatted in the same way, using the month name in alphabetic characters followed by the day in numerical format, a comma, and the year in numerical format (e.g. Nov. 12, 2010). However, the dates from another Web page might not all be formatted in the same way, and thus might not have a common set of characteristics that are uniform across all the dates on that particular web page. The data and thus data elements from each content source can be, and most likely will be in different formats.

Other examples of characteristics include, without limitation, text length ranges of a data element, numeric value ranges of a data element, instance counts of a data element on a page, the matching of text to various pre-defined patterns of characters, the automatic detection of character patterns, the classification of character patterns, the numeric value of one data element, the trending of one data element value, etc. Characters are typically alphanumeric characters. However, characters also include those used in content sources. Of course, characteristics can also include a characteristic of one data element as it relates or compares to another or a group of other characteristics of data elements. For example, one data element, a restaurant name, always has another data element, an address, and yet another data element, a rating, associated therewith. And further for example, a characteristic could be that two data elements always having the same instance count per web page (e.g. restaurant name and rating always occurring 10 times per web page). The present invention is not limited to the characteristics explicitly disclosed above, and it should be understood that other visual or substantive attribute of the data itself or as it relates to other attributes of that data element or the attributes of other data elements are all characteristics as used herein in describing the present invention. In an alternate embodiment, the characteristics are determined by a data model that correlates multiple data elements to determine similarities and/or patterns between them.

In the exemplified embodiment, after the data is extracted from a content source by the data extractor 201, the data is transmitted to a data profiler 202. The data profiler 202 receives the data from the data extractor 201 and performs data profiling on the received data through the use of the plurality of constraint modules 210-214. The data profiler 202 receives the data broken down into data elements from the data extractor 201. Data profiling is performed by the data profiler 202 by transmitting the received data to the plurality of constraint modules 210-214 and receiving information in return. Data profiling can be performed while the data extractor 201 is extracting subsequent data from the content source 101-104. As discussed in more detail below, the data profiler 202 can be operated in at least two modes: training mode or enforcement mode.

In the exemplified embodiment, after receiving the data from the data extractor 201, the data profiler 202 loads a plurality of constraint modules 210-214 and transmits the data to the plurality of constraint modules 210-214. Although only five constraint modules 210-214 are depicted in FIG. 2, the invention is not so limited and any number of constraint modules can be used in the present invention. Each constraint module 210-214 is configured to receive information from a plurality of content sources 101-104 and each constraint module can act independently of each other. In one embodiment, each constraint module 210-214 is a self contained entity. However, in alternate embodiments the plurality of constraint modules 210-214 could all be included in one entity. As discussed in more detail below, each constraint module 210-214 applies a parameter, or set of parameters, to a particular data element or set of data elements of the received data. Stated another way, each constraint module 210-214 applies a parameter, or set of parameters, to a characteristic of the received data to determine conformance therewith. Each constraint module 210-214 can only apply its parameter, or set of parameters, to a particular data element or set of data elements of the received data. Therefore, if the data received by a constraint module does not contain at least one data element needed to test its parameters, then the constraint module is deemed to be inapplicable to the data received for the particular content source.

For example, constraint module 210 checks if the data received is a valid date within the parameters of the constraint module 210. In one embodiment, the parameters of the constraint module 210 could be set to apply to only those dates formatted in a particular way (e.g. two digit numeric month, two digit numeric day, and four digit numeric year—11/12/2010), and not those formatted in another way (e.g. alphabetic month, numeric day, and numeric year—Nov. 12, 2010). Another constraint module might not care about the format of the received date, but rather only care that the dates received are in a certain range. Thereafter, the constraint module 210 applies its parameters to the data elements, or characteristics, of the received data. If the data elements received by the constraint module 210 are things other than dates (addresses, product names, prices, phone numbers, etc.) or are dates in a different format (alphabetic month, numeric data and year—Nov. 12, 2010), then the data elements do not fall within (or meet) the parameters of the constraint modules 210. As a result, constraint module 210 would be deemed inapplicable for the data received from that particular content source. However, if a data element received by the constraint module 210 is a date in a format that the constraint module 210 expects, then the data element would be deemed to fall within (or meet) the parameters of the constraint module 210, constraint module 210 is deemed applicable to the data received from that content source, and thereafter the data profiler 202 will only transmit those applicable data elements signifying dates to constraint module 210.

It should be understood that the above described iteration can be done to constraint module 210 for a plurality of different content sources. Further, it should be understood that the above described iteration can be run for every constraint module out of the plurality of constraint modules 210-214 and every content source from which the data profiler 202 receives data.

In the exemplified embodiment, summary data of the plurality of constraint modules 210-214 is stored in a data store. A data store can be any one of flash memory, an internal hard drive, an external database, or any other data store known in the art. The summary data allows the data profiler 202 to better orchestrate the plurality of constraint modules 210-214. The summary data includes, among other things, whether a particular constraint module can be applied to a particular content source, the parameters of the constraint module as applied to that content source, and which data element or set of data elements of the content source are applicable to the constraint module. Thereafter, the data profiler 202 will only transmit the appropriate data elements from applicable content sources to the constraint module. In an alternate embodiment, the summary data, or portions of the summary data, can be stored within the plurality of constraint modules.

In the exemplified embodiment, after the data profiler 202 transmits the data to the plurality of constraint modules 210-214, the data profiler 202 can transmit the data to any one of a multitude of value adding modules prior to transmitting the data to the delivery module 205. Examples of value adding modules are a change detector 204 and a filter 203.

The change detector 204 ensures that only new, not previously received data is delivered to the delivery module 205 and ultimately the end user. The change detector 204 analyzes the received data and compares it to previously received data from that content source. Any duplicate data is removed prior to transmission to the delivery module 205. In an alternate embodiment, the change detector 204 can also be used to specify if data is no longer being duplicated, but rather has been removed from the content source.

The filter 203 applies a filter to the received data and only transmits that data that passes the filter to the delivery module 205. For example, the filter 203 might be set to filter the data from a particular content source and only pass that data that contains a headline with the words "Barack Obama."

The delivery module 205 transmits the data to an end source, such as an email account 106, a database 107, a mobile device 108, or a desktop computer 109, for use by an end user. It should be understood that the any number of value adding modules can be placed at any point in the system from the data extractor to the delivery module or do not have to be used at all. Further, the present invention is not limited to just one deliver modules 205 and any number of deliver modules 205 can be used.

Figure 3:
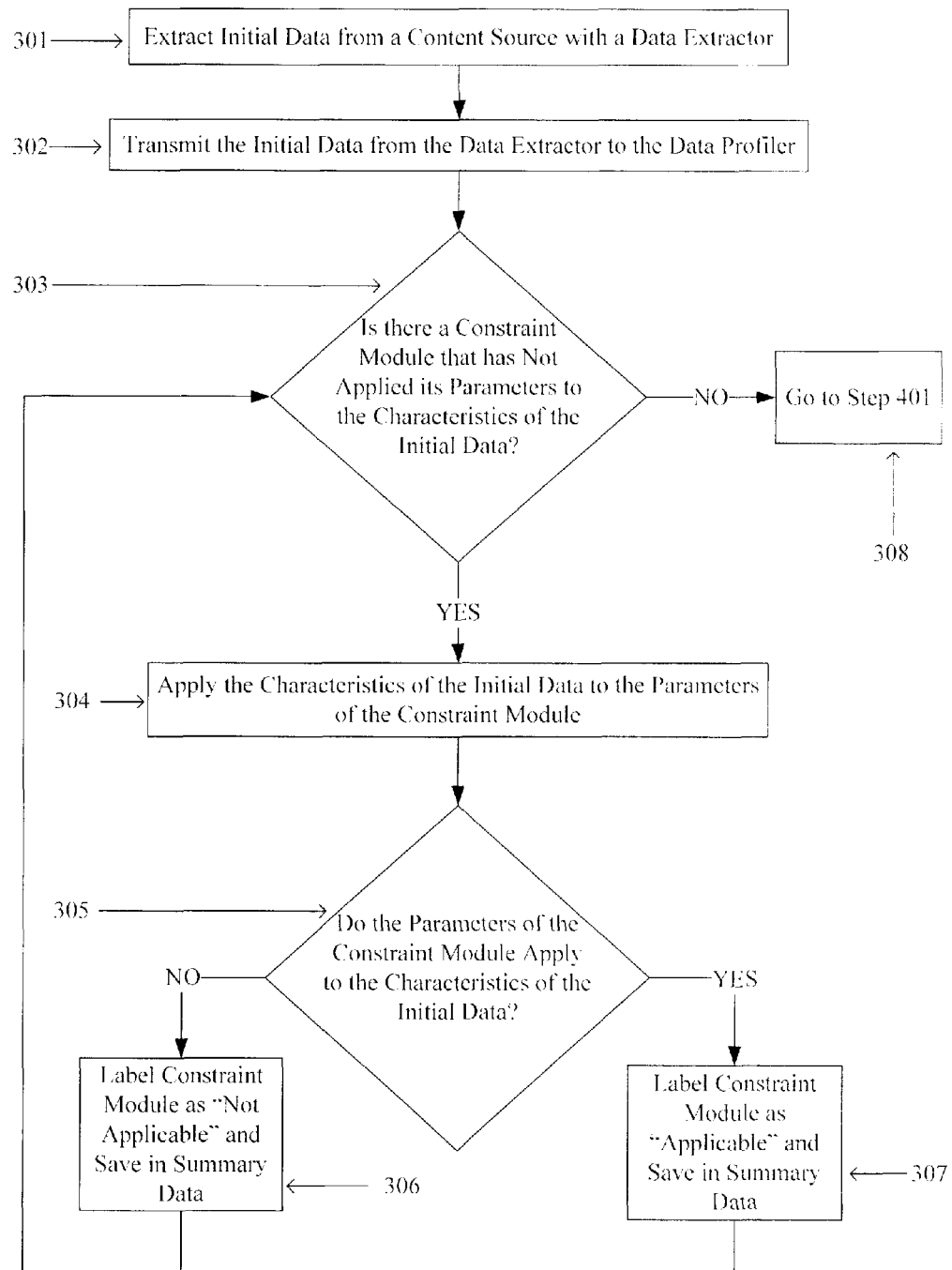
FIG. 3 is a flowchart of a method used to determine applicability of the constraint modules according to an embodiment of the present invention.
Figure 4:
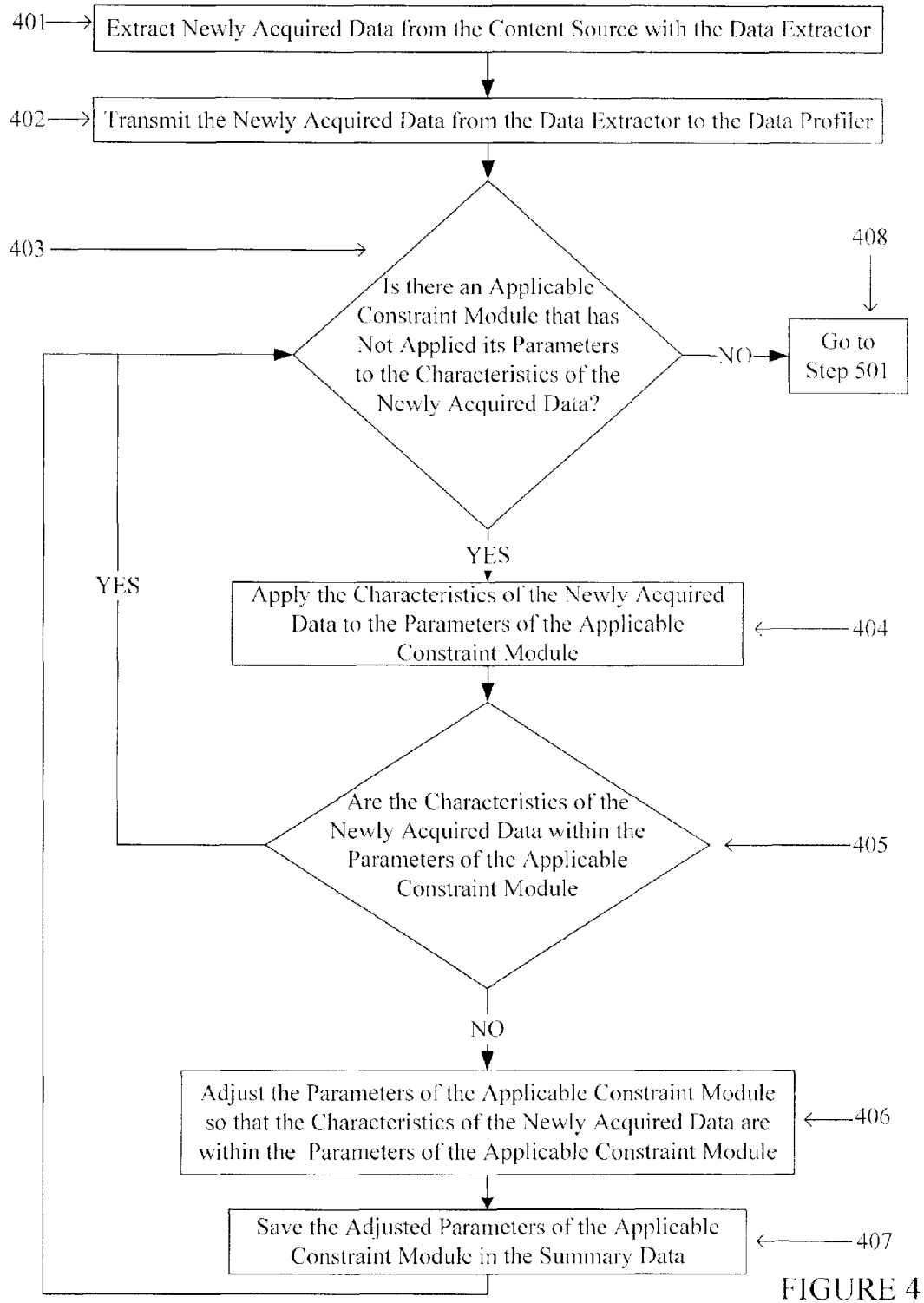
FIG. 4 is a flowchart of a method used to determine and adjust the parameters of the constraint modules according to an embodiment of the present invention.
Figure 5:
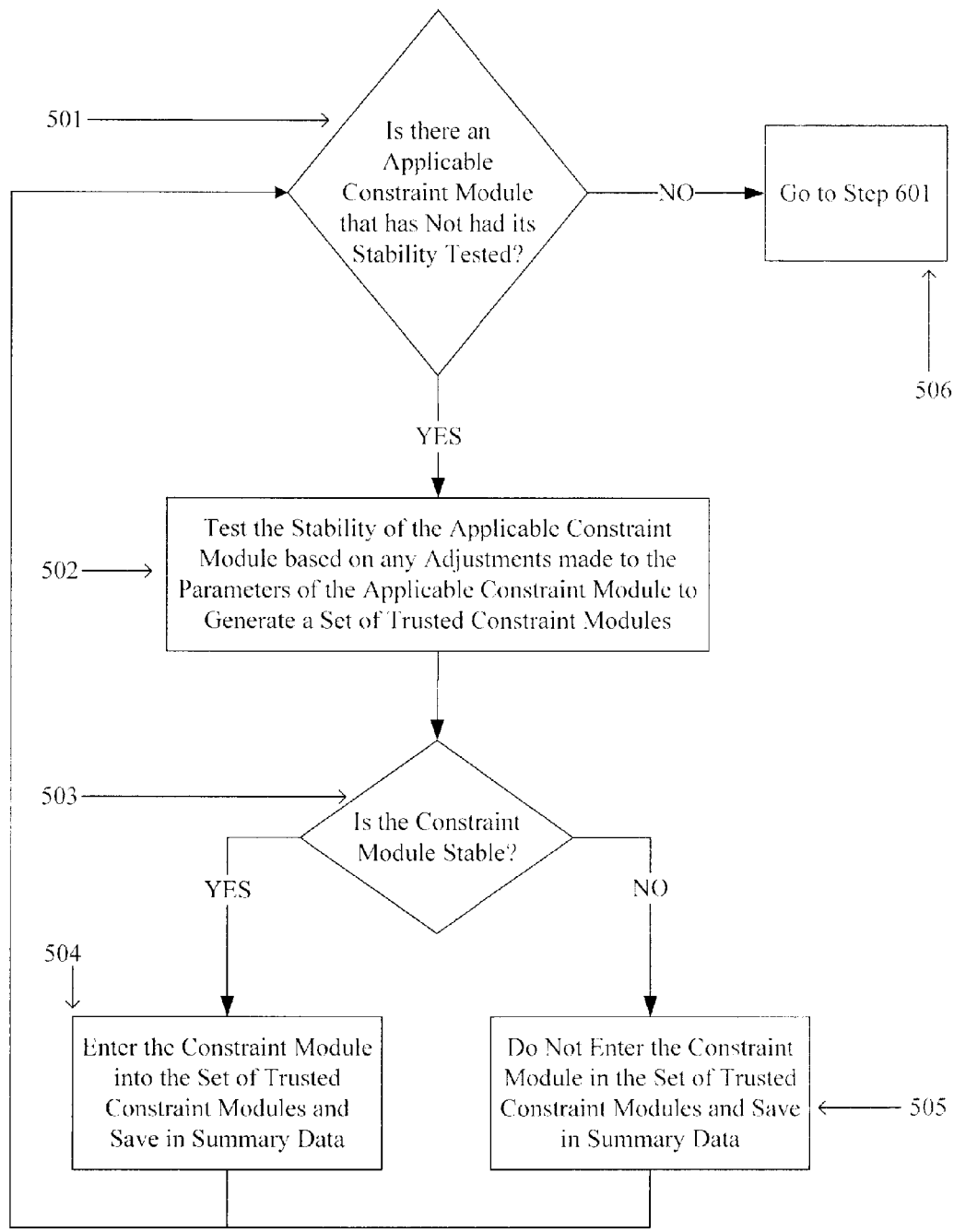
FIG. 5 is a flowchart of a method used to test the stability of the constraint modules according to an embodiment of the present invention.

Referring to FIGS. 3-5, the preferred method of training the data profiler 202 is described. After training is complete, the data profiler 202, through the use of the plurality of constraint modules 210-214, will be able to automatically determine whether subsequently extracted data from a content source is correct. In the exemplified embodiment, training comprises three steps, each of which will be described in detail below. The first step, described in FIG. 3, comprises identifying which constraint modules, out of the plurality of constraint modules 210-214, can be applied to the received data from a particular content source. The constraint modules that can be applied to the received data from a particular source are identified as applicable constraint modules for that particular content source. The second step, described in FIG. 4, comprises adjusting the parameters of the applicable constraint modules to conform to the characteristics of newly acquired data from the same content source. Thereafter, the constraint modules will have parameters that are tuned for the particular characteristics of the data received form the content source. The third step, described in FIG. 5, is to remove those constraint modules that are not stable and to generate a set of trusted constraint modules. Thereafter, only those constraint modules that have parameters that can be trusted as accurate representations of the characteristics of the received data are included in the set of trusted constraint modules. In alternate embodiments, the above described method could be used to train another module or plurality of modules to accomplish the same objective. Further, it should be understood that the method described above, and as will be described in more detail below, does not have to be sequential and can be accomplished through any reordering of the steps.

At step 301, initial data is extracted from a content source by the data extractor 201, the initial data having characteristics as described above.

At step 302, the initial data is transmitted from the data extractor 201 to the data profiler 202. In the preferred embodiment, the initial data received by the data profiler 202 is in the form of data elements.

At step 303, the data profiler 202 loads the plurality of constraint modules 210-214 and determines whether there is a constraint module, out of the plurality of constraint modules 210-214, that has not applied its parameters to the characteristics of the initial data. If there is a constraint module that has not applied its parameters to the characteristics of the initial data, then the method moves to step 304. If every constraint module has applied its parameters to the characteristics of the initial data, then the method moves to step 308.

At step 304, the data profiler 202 transmits the initial data to the constraint module that has not applied its parameters to the characteristics of the initial data. The constraint module then attempts to apply its parameters to the characteristics of the initial data to determine if its parameters are applicable.

At step 305, the constraint module determines whether it is able to apply its parameters to the characteristics of the initial data. If the constraint module cannot apply its parameters to the characteristics of the initial data, then the method moves to step 306. If the constraint module can apply its parameters to the characteristics of the initial data, then the method moves to step 307.

If the method moves to step 306, then the initial data received by the constraint module does not have the particular data element or set of data elements required for the parameter or set of parameters of that constraint module. This causes the constraint module to be labeled as "Not Applicable" for that particular content source. This information is then transmitted back to the data profiler 202 so the constraint module is not selected for receiving subsequent data from that content source. Further, this information is saved in the summary data.

However, if the method moves to step 307, then the initial data received by the constraint module does have the particular data element or set of data elements required for the parameter or set of parameters of that constraint module. This causes the constraint module to be labeled as "Applicable" for that particular content source and for the parameters of that constraint module to be adjusted so as to include the characteristics of the initial data within its parameters. This information is then transmitted back to the data profiler 202 so the constraint module is not only selected for receiving subsequent data from that content source, but so that the data profiler 202 only transmits the data element or set of data elements required for parameters of the particular constraint module. Further, this information is saved in the summary data so the data profiler 202 can better orchestrate the plurality of constraint modules 210-214 upon receiving subsequent data from the content source.

After the completion of either step 306 or 307, the method moves back to step 303, and again it is determined whether there is a constraint module, out of the plurality of constraint modules 210-214, that has not applied its parameters to the characteristics of the initial data. The above illustrated iteration is repeated until every constraint module of the plurality of constraint modules 210-214 has applied its parameters to the characteristics of the initial data from the content source, and it is determined whether or not each constraint module is applicable. After all constraint modules have been deemed applicable or not applicable, the method moves to step 308, which points to step 401 described in FIG. 4.

In an alternate embodiment, there is a constraint module or set of constraint modules that is pre-determined to be applicable to the characteristics of the data of a particular content source. In one alternative embodiment, this is done by a user. In such a case, those constraint modules do not have to go through the above illustrated iteration, and can proceed directly to step 401.

In the exemplified embodiment, at the conclusion of the first step, a set of applicable constraint modules for a particular content source is generated. The set of applicable constraint modules allows the data profiler to know what constraint modules can be successfully applied to subsequent received data from that particular data source. Further, the data profiler knows what data elements of the subsequently received data should be transmitted to each constraint module to limit the transmission of inapplicable data. The parameters and acceptable data elements of each applicable constraint module, as they apply to each content source, is stored in summary data.

At step 401, newly acquired data from the same content source is extracted by the data extractor 201, the newly acquired data having characteristics as described above.

At step 402, the newly acquired data is transmitted from the data extractor 201 to the data profiler 202. In the preferred embodiment, the newly acquired data received by the data profiler 202 is in the form of data elements.

At step 403, the data profiler 202 loads the applicable constraint modules and determines whether there is an applicable constraint module that has not applied its parameters to the characteristics of the newly acquired data. If there is an applicable constraint module that has not applied its parameters to the characteristics of the newly acquired data, then the method moves to step 404. If every applicable constraint module has applied its parameters to the characteristics of the newly acquired data, then the method moves to step 408.

At step 404, the data profiler 202 transmits the newly acquired data to the applicable constraint module that has not applied its parameters to the characteristics of the newly acquired data. The applicable constraint module then applies its parameters to the characteristics of the newly acquired data to determine if the characteristics of the newly acquired data are within the parameters of the applicable constraint module.

At step 405, the applicable constraint module determines whether the characteristics of the newly acquired data are within (or meet) its parameters. If the characteristics of the newly acquired data are within (or meet) the parameters of the applicable constraint module, then the method moves back to step 403. If the characteristics of the newly acquired data are not within (or meet) the parameters of the applicable constraint module, then the method moves to step 406.

In an alternate embodiment, the constraint module will also continue to check if it is applicable to the data received from the content source. If the constraint module determines that it was mislabeled as applicable, then the constraint module will re-label itself inapplicable and unselect itself so subsequent data from that content source is not transmitted to it by the data profiler 202. If the constraint module determines that it was properly labeled applicable, then the constraint module will move forward in the method.

In another alternate embodiment, the constraint module will also make a determination on its stability (discussed in more detail below) at this step in the process. If the constraint module determines it is stable, then the constraint module can remove itself from the process and include itself in the set of trusted constraint modules (also discussed in more detail below). If the constraint module can not determine if it is stable, then the constraint module will move forward in the method.

If the method moves to step 403, then the parameters of the applicable constraint module are within the characteristics of the newly acquired data, and thus the parameters do not have to be adjusted.

If the method moves to step 406, then the parameters of the applicable constraint module are adjusted so that the characteristics of the newly acquired data fall within its parameters. For example, if the parameters of the applicable constraint module specified an earliest date (no earlier than Jan. 1, 1990), and the newly acquired data specified a date that was earlier then the date specified by the parameters of the constraint module (Jan. 1, 1989), then the parameters of the applicable constraint module are adjusted to include that date within its parameters (no earlier then Jan. 1, 1989) and the new parameters are saved by the constraint module. Thereafter, the method moves to step 407.

At step 407, the adjusted parameters of the, applicable constraint module are saved for that particular content source, this information is saved in the summary data, and the method moves back to step 403.

After the completion of either step 405 or 407, the method moves back to step 403, and again it is determined whether there is an applicable constraint module that has not applied its parameters to the characteristics of the newly acquired data. The above illustrated iteration is repeated until every applicable constraint module has applied its parameters to the characteristics of the newly acquired data from the content source. After all the applicable constraint modules have parameters that are within the characteristics of the newly acquired data, the method moves to step 408, which points to step 501 described in FIG. 5.

In the exemplified embodiment, at the conclusion of the second step, the parameters of the applicable constraint modules will be adjusted to conform to the characteristics of newly acquired data from the content source. Therefore, the characteristics of both the initial and newly acquired data are within the parameters of all the applicable constraint modules.

In an alternate embodiment, this method of FIG. 4 will continue for an extended period of time, whereby the characteristics of data subsequently received will be continuously applied to the parameters of each constraint module, continuously adjusting the parameters as needed. After receiving data from a content source for an extended period of time, the data profiler and constraint modules will have several correct examples of how the characteristics of a particular data element look. Since several correct examples have been received, the data profiler can look at the particular data elements extracted and consider developing additional constraints by observing their characteristics. In another alternative embodiment, a human provides the parameters to the plurality of constraint modules.

In another alternate embodiment, there is an applicable constraint module or set of applicable constraint modules that is pre-determined to have parameters within the characteristics of the data of a particular content source. In such a case, those applicable constraint modules do not have to go through the iteration described above.

Referring to FIG. 5, at step 501 it is determined whether there is an applicable constraint module that has not had its stability tested. A constraint module's stability relates to, among other variables, the number of adjustments, the rate of adjustments, or the degree of adjustments made to its parameters during the application of the characteristics of data from the content source. If there is an applicable constraint module that has not had its stability tested, then the method moves to step 502. If all the applicable constraint modules have had their stability tested, then the method moves to step 506.

At step 502, the stability of an applicable constraint module is tested. The stability of the applicable constraint module is determined based on any adjustments made to the parameters of the applicable constraint module in step 406. In alternate embodiments, the stability of a constraint module can be determined at another step in the described method, and/or can be pre-determined or determined based on a variable other than the number or degree of adjustments to its parameters. Thereafter, the method proceeds to step 503.

If the method moves to step 503, it is determined whether the applicable constraint module is stable. If the applicable constraint module is determined to be stable, then the method moves to step 504. If the applicable constraint module is determined not to be stable, then the method moves to step 505. Examples of ways for determining whether an applicable constraint module is stable are described below.

In a preferred embodiment, the constraint module comprises code that runs a stability algorithm. The stability algorithm determines if the frequency at which an applicable constraint module is adjusted in the second step exceeds a certain threshold parameter. If the constraint module is adjusted at a frequency that does not exceed the threshold, then the constraint module is considered stable. If the constraint module is adjusted at a frequency that exceeds the threshold, then the constraint module is considered non-stable.

In an alternate embodiment, the constraint module comprises code that runs a stability trending algorithm. The stability trending algorithm determines if the frequency of which the applicable constraint module is adjusted in step two is trending towards, or approaching a threshold value. If the adjustment rate is trending towards, or approaching the threshold value, then the constraint module is considered stable. If the adjustment rate is trending away from the threshold value, then the constraint module is considered non-stable.

In another alternate embodiment, the constraint module comprises code that runs an estimation algorithm. The estimation algorithm determines if an estimate can be calculated of how far the parameters of the constraint module will have to be adjusted in order to stabilize. If the algorithm can calculate an estimate, then the parameters of the constraint module are set to the value of the estimated required change and the constraint module is considered stable. If the algorithm cannot calculate an estimate, then the constraint module is considered non-stable. In an alternate embodiment, the estimation algorithm may defer the determination of stability for subsequent iterations, requiring the constraint module to receive additional subsequent data and return to an earlier step in the method described in FIGS. 3-6. In another alternate embodiment, the estimate is verified by another module or by a user.

It should be noted, that in an alternate embodiment, the code running the stability algorithm, the stability trending algorithm, or the estimation algorithm could be included in another module.

If the method moves to step 504, the applicable constraint module has passed the stability test and is entered into a set of trusted constraint modules. The set of trusted constraint modules are those constraint modules out of the plurality of constraint modules 210-214 that are not only applicable to the data from a particular site, but whose parameters can be trusted as an accurate representation of the characteristics of the data received from the content source. The set of trusted constraint modules for the particular content source is then stored in the summary data.

If the method moves to step 505, the applicable constraint module has not passed the stability test and is not entered into the set of trusted constraint modules. The fact that an applicable content source is not included in the set of trusted constraint modules is stored in the summary data.

After concluding either step 504 or 505, the method moves back to step 501 to determine if there are any applicable constraint modules that have not had their stability tested. The above illustrated iteration is repeated until every applicable constraint module has had its stability tested. After all the applicable constraint modules have had their stability tested, the method moves to step 506, which points to step 601 described in FIG. 6.

In an alternate embodiment, there is an applicable constraint module or set of applicable constraint modules that are pre-determined to be stable constraint modules. In such a case, those applicable constraint modules do not have to go through the above illustrated iteration and are entered into the set of trusted constraint modules.

In yet another alternate embodiment, stability testing can be accomplished at an earlier step in the process. For example, stability testing can be accomplished during the determination of applicability at step 305 or step 405, or at any other step that is prior to step 503. The stability of the constraint modules can also be continuously determined throughout the entire method, including in subsequent steps to ensure the constraint modules are remaining stable.

At the conclusion of the third step, the non-stable constraint modules out of the applicable constraint modules are removed to generate a set of trusted constraint modules. The generated set of trusted constraint modules comprises all the applicable constraint modules that have parameters that can be trusted to meet the characteristics of the data received from the content source. Further, since the trusted constraint modules went through the adjustment steps described above, their parameters are tailored for the specific characteristics of the data from a particular content source.

Figure 6:
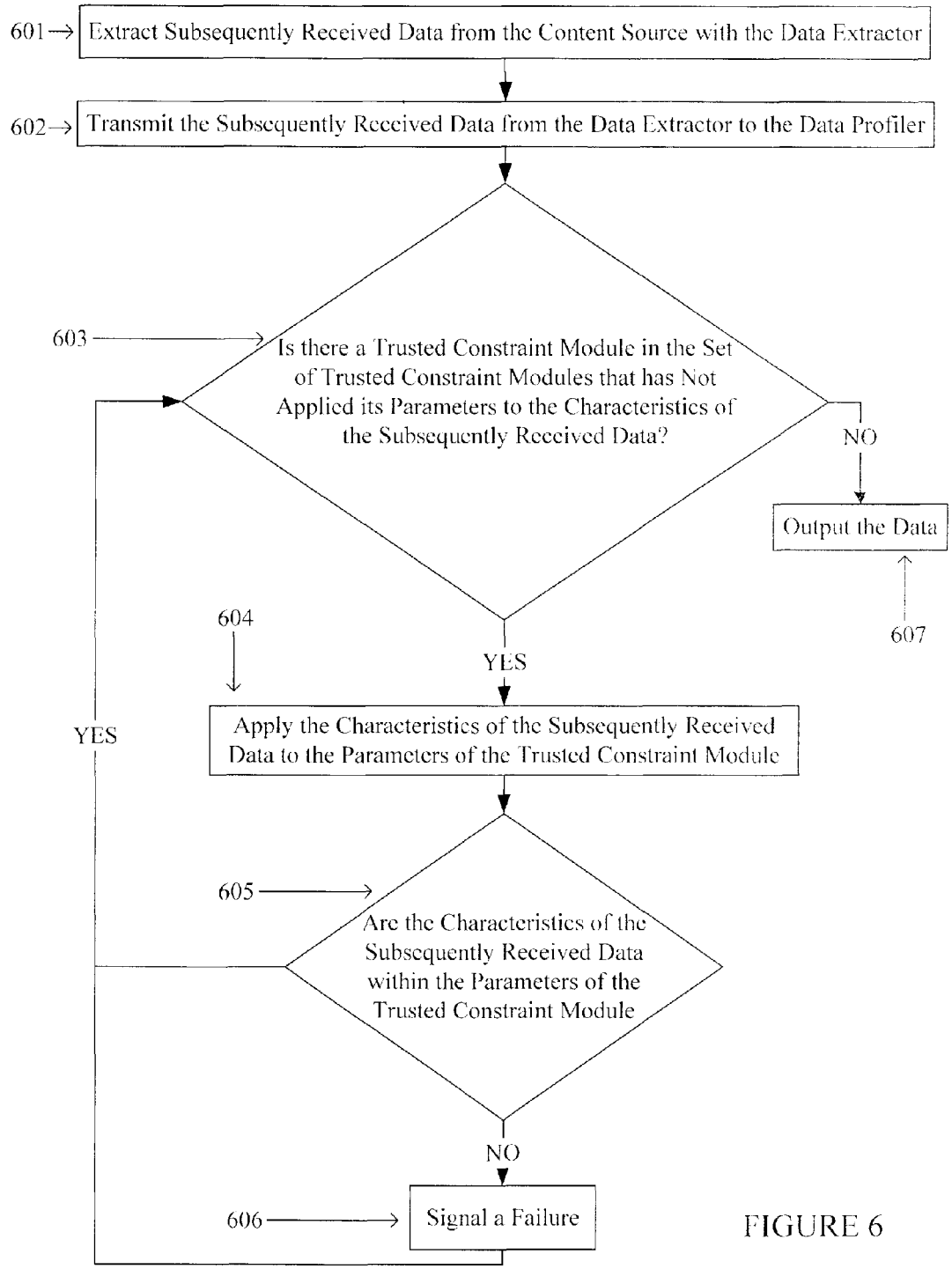
FIG. 6 is a flowchart of a method used to monitor the characteristics of subsequently received data according to an embodiment of the present invention.

Referring to FIG. 6, a method of enforcing the set of trusted constraint modules is described. The data profiler 202 orchestrates the set of trusted constraint modules to apply them to subsequently received data from the content source to determine whether the characteristics of the subsequently received data meet the parameters of the set of trusted constraint modules. If the characteristics of a data element fail to meet a parameter of a trusted constraint module, then the data profiler signals a failure.

Referring to FIG. 6, at step 601, subsequently received data is extracted from a content source by the data extractor 201, the subsequently received data having characteristics as described above.

At step 602, the subsequently received data is transmitted from the data extractor 201 to the data profiler 202. In the preferred embodiment, the subsequently received data received by the data profiler 202 is in the form of data elements.

At step 603, the data profiler 202 loads the set of trusted constraint modules and determines whether there is a constraint module, out of the set of trusted constraint modules that has not applied its parameters to the characteristics of the subsequently received data. If there is a trusted constraint module that has not applied its parameters to the characteristics of the subsequently received data, then the method moves to step 604. If every trusted constraint module, out of the set of trusted constraint modules has applied its parameters to the characteristics of the subsequently received data, then the method moves to step 607.

At step 604, the data profiler 202 transmits the subsequently received data to the trusted constraint module that has not applied its parameters to the characteristics of the subsequently received data. The trusted constraint module then applies its parameters to the characteristics of the subsequently received data to determine if the characteristics of the subsequently received data are within its parameters.

At step 605, the trusted constraint module determines whether the characteristics of the subsequently received data are within its parameters. If the characteristics of the subsequently received data are not within the parameters of the trusted constraint module, then the method moves to step 606. If the characteristics of the subsequently received data are within the parameters of the trusted constraint module, then the method moves back to step 603.

If the method moves back to step 603, then the characteristics of the subsequently received data are within the parameters of the trusted constraint module, and thus the data has passed that particular trusted constraint module.

If the method moves to step 606, then a failure is signaled. This is because the characteristics of the subsequently received data are not within the parameters of a trusted constraint module. If the characteristics of the subsequently received data are not within the parameters of a trusted constraint module, then the extracted data is not trusted to be accurate. One such situation arises when the content source is modified and the data is no longer in the same format as it originally was when the data extraction was initialized. This causes errors in the data extracted from the content source, which is solved by modifying the data extractor 201. The method then moves to step 603.

In the preferred embodiment, the signal is used to notify a user by sending a signal from the server 200 to any of an email account 106, a database 107 for entry into a log, a mobile device 108 through SMS or other data application, through Microsoft SCOM® or other monitoring agent, or to a user at a computer terminal 109. The user can analyze the content source and data extractor 201 to determine why a failure occurred. If required, the user can manually retune the data extractor 201 to prevent future failures.

In an alternate embodiment, the signal is entered into a database 107 for entry into a log. Thereafter, a user can check the log at their leisure to determine the history of the data extractor 201, data profiler 202 and the specific constraint modules used for the specific content source, and make any corrections or adjustments as needed.

In another alternate embodiment, the signal is used to automatically adjust the data extractor 201, data profiler 202 or plurality of constraint modules 210-214. Thereafter, the process can proceed iteratively until the data profiler 202 and constraint modules pass the enforcement mode without any failure signals.

After the completion of either step 605 or 606, the method moves back to step 603, and it is determined whether there is a trusted constraint module out of the set of trusted constraint modules that has not applied its parameters to the characteristics of the subsequently received data. The above illustrated iteration is repeated until every trusted constraint module out of the set of trusted constraint modules has applied its parameters to the characteristics of the subsequently received data. After all the trusted constraint modules in the set of trusted constraint modules have applied their parameters to the characteristics of the subsequently received data, the method moves to step 607.

At step 607, the data is trusted as being accurate and is outputted for further processing within the server 200 or it is transmitted to a data consumer such as an email account 106, a database 107, a mobile device 108, or a desktop computer 109. However, the present invention is not so limiting and other data consumers can be used.

It should be understood that the above illustrated method does not have to be sequential, and all of the above described steps in FIGS. 3-6 can be applied in any order. For example, the methods of steps 305, 405, and 503 can be applied at any point in the method described in FIGS. 3-6.

In an alternate embodiment, another module or a plurality of other modules can apply the methods of any of the above described steps in FIGS. 3-6. For example, another module could perform the determinations made in steps 303, 305, 403, 405, 501, 503, 603 and 605.

In another alternate embodiment, new constraint modules are added in the middle of the above described method in FIGS. 3-6. Furthermore, the added constraint modules can be modified by a user as they see fit to best incorporate them in the system. Also, the new constraint modules can be included after the method described in FIGS. 3-6 is complete, so that only those constraint modules that are new have to go through every step in the method.

In yet another alternate embodiment, a constraint module out of the plurality of constraint modules might be pre-tuned or adjusted using the data extracted from another or a plurality of other content sources.

In yet another alternate embodiment, in the method described in FIGS. 3-6, the data profiler, or other module, can move some constraint modules to the set of trusted constraint modules and to step 601 while others are left in earlier steps of the method. Therefore, some constraint modules might be determined to be trusted at an early step in the process, while others require the application of additional data from the content source to determine their parameters and/or stability.

In yet another alternate embodiment, when a new content source is identified its content can be mapped to a schema, which in turn would select a plurality of constraint modules to apply to the characteristics of its data. Further, the plurality of constraint modules might have their parameters pre-set based on the mapping of the new content source to the pre-defined schema. These selected plurality of constraint modules can be the only constraint modules used in the method of FIGS. 3-6.

While the foregoing description and drawings represent the exemplary embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A method of training a data profiler to monitor a quality of data extracted from a content source, the method comprising:
   receiving an acceptable data element for a first characteristic of data extracted from a first content source by a data extractor;
   identifying, from a plurality of constraint modules, a set of one or more constraint modules applicable to the first characteristic;
   adjusting, for each constraint module in the identified set of one or more constraint modules, parameters of the respective constraint module to accept the received acceptable data element;
   determining, for each constraint module in the identified set of one or more constraint modules, based on the adjustments, whether each respective constraint module is stable or non-stable; and
   generating a set of trusted constraint modules selected from the stable constraint modules, omitting the constraint modules determined as non-stable.

2. The method of claim 1 comprising:
   receiving a second acceptable data element for the first characteristic of data extracted from the first content source;
   adjusting, for each constraint module in the set of trusted constraint modules, parameters of the respective constraint module to accept the received second acceptable data element; and
   removing constraint modules determined as non-stable from the set of trusted constraint modules.

3. The method of claim 2 comprising:
   receiving an extracted data element extracted from the first content source, identified as being for the first characteristic;
   determining, by applying the set of trusted constraint modules to the received extracted data element, that the received extracted data element does not meet the parameters of the set of trusted constraint modules; and
   signaling a failure condition.

4. The method of claim 3, wherein signaling the failure condition comprises sending a signal to at least one of: an email account, a database for entry into a log, a mobile device, an SMS system, a monitoring agent, or to a user at a computer terminal.

5. The method of claim 3, wherein signaling the failure comprises sending an error signal to a processor, the method further comprising the processor automatically adjusting subsequent extraction of data elements from the content source.

6. The method of claim 1 wherein the first characteristic is one of a text length range, a numeric value range, a count of data elements, a value for a data element, a pattern of characters to be matched by a data element, or a comparison between data elements.

7. The method of claim 1 wherein generating the set of trusted constraint modules comprises including, in the set of trusted constraint modules, a set of applicable constraint modules that are pre-determined to be stable constraint modules.

8. The method of claim 1 wherein the non-stable constraint modules are constraint modules identified as one of:
   constraint modules that have been adjusted at a frequency that exceeds a threshold value of a stability algorithm; and
   constraint modules that have been adjusted at a rate that is trending away from a threshold value of a stability trending algorithm.

9. The method of claim 1 wherein the stable constraint modules are constraint modules that are identified as one of:
   constraint modules that have been adjusted at a frequency within a threshold value of a stability algorithm; and
   constraint modules that have been adjusted at a rate that is trending towards a threshold value of a stability trending algorithm.

10. The method of claim 1 wherein the plurality of constraint modules are sourced from a trusted set of constraint modules for the first characteristic of data extracted from a second content source.

11. A system comprising:
   a data extractor configured to extract data from a first content source;
   a data profiler, comprising at least one computing processor and memory storing instructions that, when executed by the at least one computing processor, cause the at least one computing processor to:
      receive an acceptable data element for a first characteristic of data extracted from the first content source by the data extractor;
      identify, from a plurality of constraint modules, a set of one or more constraint modules applicable to the first characteristic;
      adjust, for each constraint module in the identified set of one or more constraint modules, parameters of the respective constraint module to accept the received acceptable data element;
      determine, for each constraint module in the identified set of one or more constraint modules, based on the adjustments, whether each respective constraint module is stable or non-stable; and
      generate a set of trusted constraint modules selected from the stable constraint modules, omitting the constraint modules determined as non-stable.

12. The system of claim 11, wherein the instructions further cause the at least one computing processor to:
   receive a second acceptable data element for the first characteristic of data extracted from the first content source;
   adjust, for each constraint module in the set of trusted constraint modules, parameters of the respective constraint module to accept the received second acceptable data element; and remove constraint modules determined as non-stable from the set of trusted constraint modules.

13. The system of claim 12, wherein the instructions further cause the at least one computing processor to:
- receive an extracted data element extracted from the first content source, identified as being for the first characteristic;
- determine, by applying the set of trusted constraint modules to the received extracted data element, that the received extracted data element does not meet the parameters of the set of trusted constraint modules; and
- signal a failure condition.

14. The system of claim 13, wherein signaling the failure condition comprises sending a signal to at least one of: an email account, a database for entry into a log, a mobile device, an SMS system, a monitoring agent, or to a user at a computer terminal.

15. The system of claim 13, wherein signaling the failure comprises sending an error signal to a processor, the method further comprising the processor automatically adjusting subsequent extraction of data elements from the content source.

16. The system of claim 11 wherein the first characteristic is one of a text length range, a numeric value range, a count of data elements, a value for a data element, a pattern of characters to be matched by a data element, or a comparison between data elements.

17. The system of claim 11 wherein generating the set of trusted constraint modules comprises including, in the set of trusted constraint modules, a set of applicable constraint modules that are pre-determined to be stable constraint modules.

18. The system of claim 11 wherein the non-stable constraint modules are constraint modules identified as one of:
- constraint modules that have been adjusted at a frequency that exceeds a threshold value of a stability algorithm; and
- constraint modules that have been adjusted at a rate that is trending away from a threshold value of a stability trending algorithm.

19. The system of claim 11 wherein the stable constraint modules are constraint modules that are identified as one of:
- constraint modules that have been adjusted at a frequency within a threshold value of a stability algorithm; and
- constraint modules that have been adjusted at a rate that is trending towards a threshold value of a stability trending algorithm.

20. The system of claim 11 wherein the plurality of constraint modules are sourced from a trusted set of constraint modules for the first characteristic of data extracted from a second content source.

* * * * *